US010291938B2

United States Patent
Sole et al.

(10) Patent No.: US 10,291,938 B2
(45) Date of Patent: May 14, 2019

(54) METHODS AND APPARATUS FOR ADAPTIVE FILTERING OF PREDICTION PIXELS FOR CHROMA COMPONENTS IN VIDEO ENCODING AND DECODING

(75) Inventors: Joel Sole, LaJolla, CA (US); Xiaoan Lu, Princeton, NJ (US); Peng Yin, Ithaca, NY (US); Qian Xu, Folsom, CA (US); Yunfei Zheng, Cupertino, CA (US)

(73) Assignee: INTERDIGITAL MADISON PATENT HOLDINGS, Paris (FR)

(*) Notice: Subject to any disclaimer, the term of this patent is extended or adjusted under 35 U.S.C. 154(b) by 1530 days.

(21) Appl. No.: 13/500,119

(22) PCT Filed: Sep. 30, 2010

(86) PCT No.: PCT/US2010/002657
§ 371 (c)(1),
(2), (4) Date: Apr. 4, 2012

(87) PCT Pub. No.: WO2011/043797
PCT Pub. Date: Apr. 14, 2011

(65) Prior Publication Data
US 2012/0201311 A1 Aug. 9, 2012

Related U.S. Application Data

(60) Provisional application No. 61/248,709, filed on Oct. 5, 2009.

(51) Int. Cl.
*H04N 19/14* (2014.01)
*H04N 19/82* (2014.01)
(Continued)

(52) U.S. Cl.
CPC ............ *H04N 19/82* (2014.11); *H04N 19/117* (2014.11); *H04N 19/127* (2014.11); *H04N 19/14* (2014.11);
(Continued)

(58) Field of Classification Search
None
See application file for complete search history.

(56) References Cited

U.S. PATENT DOCUMENTS 5,367,385 A * 11/1994 Yuan .................... H04N 19/176
348/420.1
5,412,434 A * 5/1995 Taniguchi ................ H04N 9/78
348/663
(Continued)

FOREIGN PATENT DOCUMENTS

CN    10109842 A    8/2007
CN    101123725 A   2/2008
(Continued)

OTHER PUBLICATIONS

Amonou et al., "Description of Video Coding Technology Proposal by France Telecom, NTT, NTT DOCOMO, Panasonic and Technicolor", Joint Collaborative Team on Video Coding (JCT-VC) of ITU-T SG16 WP3 and ISO/IEC JTC1/SC29/WG11, Document: JCTVC-A114, 1st Meeting: Desden, DE, Apr. 15-23, 2010, pp. 1-42.
(Continued)

*Primary Examiner* — Dave Czekaj
*Assistant Examiner* — Tyler W. Sullivan
(74) *Attorney, Agent, or Firm* — Brian J. Dorini; Ronald Kolczynski

(57) ABSTRACT

Methods and apparatus are provided for adaptive filtering of prediction pixels for chroma components in video encoding and decoding. An apparatus includes a video encoder for encoding picture data for at least a portion of a picture. The
(Continued)

video encoder includes an adaptive filter for performing filtering of prediction data used to generate an intra prediction for a chroma component of the portion of the picture. The filtering is adaptive with respect to at least one of filter parameters for the filtering and whether the filtering is used or bypassed.

25 Claims, 6 Drawing Sheets

(51) Int. Cl.
*H04N 19/176* (2014.01)
*H04N 19/593* (2014.01)
*H04N 19/117* (2014.01)
*H04N 19/127* (2014.01)
*H04N 19/186* (2014.01)
*H04N 19/182* (2014.01)

(52) U.S. Cl.
CPC ......... *H04N 19/176* (2014.11); *H04N 19/182* (2014.11); *H04N 19/186* (2014.11); *H04N 19/593* (2014.11)

(56) References Cited

U.S. PATENT DOCUMENTS

| | | | | |
|---|---|---|---|---|
| 7,203,234 | B1* | 4/2007 | Zeng | G06T 5/002 348/699 |
| 7,379,499 | B2 | 5/2008 | Dahlhoff et al. | |
| 8,149,910 | B2 | 4/2012 | Tanizawa et al. | |
| 8,442,334 | B2 | 5/2013 | Drugeon et al. | |
| 8,559,511 | B2* | 10/2013 | Ngan | H04N 19/159 375/240.02 |
| 2005/0243912 | A1* | 11/2005 | Kwon et al. | 375/240.03 |
| 2006/0002468 | A1 | 1/2006 | Zhou et al. | |
| 2007/0002945 | A1* | 1/2007 | Kim | H04N 19/176 375/240 |
| 2007/0172211 | A1 | 7/2007 | Panda et al. | |
| 2007/0216763 | A1 | 9/2007 | Rossholm et al. | |
| 2008/0117980 | A1* | 5/2008 | Hung et al. | 375/240.24 |
| 2008/0137752 | A1* | 6/2008 | He | 375/240.24 |
| 2008/0240252 | A1* | 10/2008 | He | 375/240.24 |
| 2008/0253454 | A1 | 10/2008 | Imamura et al. | |
| 2008/0267289 | A1 | 10/2008 | Yu et al. | |
| 2010/0061645 | A1* | 3/2010 | Wilkins | H04N 19/50 382/238 |
| 2010/0135389 | A1 | 6/2010 | Tanizawa et al. | |
| 2011/0188574 | A1* | 8/2011 | Matsuo | H04N 19/176 375/240.12 |
| 2011/0188581 | A1* | 8/2011 | Choi et al. | 375/240.24 |
| 2012/0044991 | A1* | 2/2012 | Mochizuki | 375/240.12 |
| 2013/0044814 | A1* | 2/2013 | Guo et al. | 375/240.12 |

FOREIGN PATENT DOCUMENTS

| | | |
|---|---|---|
| JP | 2005-512419 A | 4/2005 |
| JP | 2005117449 | 4/2005 |
| JP | 2006094081 | 4/2006 |
| JP | 2008263529 | 10/2008 |
| KR | 20070037532 | 4/2007 |
| WO | 2007/063808 A1 | 6/2007 |
| WO | 2008/075247 A1 | 6/2008 |
| WO | WO2009001793 | 12/2008 |
| WO | 2009/090884 A1 | 7/2009 |
| WO | WO2009120040 | 10/2009 |

OTHER PUBLICATIONS

Misra et al., "Couupled Pre-Post-Processing Filters for Predictive Video Coding", Proceedings of 2010 IEEE 17th International Conference on Image Processing, Sep. 26, 2010, pp. 2761-2764.

Wien, "Clean-Up and Improved Design Consistency for ABT", Joint Video Team (JVT) of ISO/IEC MPEG & ITU-T VCEG, Document: JVT-E025, 5th Meeting: Geneva, CH, Oct. 9-17, 2002, nine pages.

ITU-T H.264 Telecommunication Standardization Sector of ITU, "Advanced Video Coding for Generic Audiovisual Services", Mar. 2005, 343 pages.

Lim et al., "Intra Coding Using Extended Block Size", ITU—Telecommunications Standardization Sector, Document: VCEG-AL28, 38th Meeting: London, UK / Geneva, CH, Jul. 1-8, 2009, five pages.

Lee et al., "Technical Considerations for Ad Hoc Group on New Challenges in Video Coding Standardization," International Organisation for Standardisation, ISO/IEC JTC1/SC29/WG11, Hannover Germany, Jul. 2008, nine pages.

* cited by examiner

METHODS AND APPARATUS FOR ADAPTIVE FILTERING OF PREDICTION PIXELS FOR CHROMA COMPONENTS IN VIDEO ENCODING AND DECODING

CROSS-REFERENCE TO RELATED APPLICATIONS

This application is a National Stage Application and claims the benefit, under 35 U.S.C. § 365 of International Application PCT/US2010/002657 filed 30 Sep. 2010 which was published in accordance with PCT Article 21(2) on 14 Apr. 2011 in English, and which claims the benefit of U.S. Provisional Patent Application No. 61/248,709 filed on 5 Oct. 2009.

TECHNICAL FIELD

The present principles relate generally to video encoding and decoding and, more particularly, to methods and apparatus for adaptive filtering of prediction pixels for chroma components in video encoding and decoding.

BACKGROUND

Most modern video coding standards employ various coding modes to efficiently reduce the correlations in the spatial and temporal domains. In the International Organization for Standardization/International Electromechanical Commission (ISO/IEC) Moving Picture Experts Group-4 (MPEG-4) Part 10 Advanced Video Coding (AVC) Standard/International Telecommunication Union, Telecommunication Sector (ITU-T) H.264 Recommendation (hereinafter the "MPEG-4 AVC Standard"), a picture can be intra or inter coded. In intra pictures, all macroblocks (16×16) are coded in intra modes that exploit spatial correlations in the picture. For intra luma coding, intra modes can be classified into the following three partition types: INTRA4×4; INTRA8×8; and INTRA16×16. INTRA4×4 uses a 4×4 discrete cosine transform (DCT) transform. INTRA8×8 uses 8×8 transforms. INTRA16×16 uses a 4×4 integer DCT cascaded with a 4×4 DC Hadamard transform. For intra chroma coding, only one partition type is allowed. Each 8×8 chroma component of an intra coded macroblock is predicted with 4 intra prediction modes and uses a 4×4 integer DCT cascaded with a 2×2 DC Hadamard transform. The chroma partition type is fixed irrespective of the luma partition type.

When using a larger block size (e.g., 8×8 or 16×16) for intra prediction of the chroma component, there is a need to filter the pixels used for the prediction. This filtering process smoothes the prediction signal and eliminates some noise. In the luma component, large block sizes use a low-pass linear filter with taps equal to [1 2 1]/4. The filtering improves the quality of the prediction, thus increasing the efficiency of the video coding. However, we have observed that the same filter applied to the chroma components does not provide the same benefits. The objective distortion (PSNR) does not decrease, while the subjective quality is worse.

MPEG-4 AVC Standard Intra Coding

The MPEG-4 AVC Standard uses intra modes to exploit spatial correlations in the picture. For intra luma coding, intra modes can be classified into three types: INTRA4×4, INTRA8×8, and INTRA16×16. INTRA4×4 and INTRA8×8 support 9 intra prediction modes and INTRA16×16 supports 4 intra prediction modes. Since the basic coding unit in the MPEG-4 AVC Standard is a macroblock, i.e., the size is 16×16, the partition types inside a macroblock are either all 16×16, 8×8 or 4×4. There are no mixed partition types inside a macroblock. As noted above, INTRA4×4 uses a 4×4 DCT transform, INTRA8×8 uses 8×8 transforms, and INTRA16×16 uses cascaded 4×4 transforms. For the signaling, INTRA4×4 and INTRA8×8 share the same macroblock type (mb_type 0) and they are differentiated by a transform size flag (transform_8×8_size_flag). Then, the choice of intra prediction mode in INTRA4×4 or INTRA8×8 is signaled by the most probable mode possibly with remaining mode if necessary. For example, for the 4×4 case, the encoder sends a flag for each 4×4 block called prev_intra4×4_pred_mode. If the flag is equal to "1", then the most probable prediction mode is used. Otherwise, if the flag is equal to "0", then another parameter rem_intra4×4_pred_mode is sent to indicate a change of mode. For INTRA16×16, all of the intra prediction modes along with the coded block pattern (cbp) type are signaled in mb_type, which uses a value for mb_type from 1 to 24. For intra chroma coding, each 8×8 chroma component of an intra coded macroblock is predicted using 4 intra prediction modes, i.e., each 8×8 chroma component is split and uses a 4×4 integer DCT cascaded with a 2×2 DC Hadamard transform. Intra chroma coding is fixed independent of the luma partition type. Infra chroma coding does not adapt to the content, thus reducing the fidelity of chroma coding.

In the case of the 4:4:4 format of the MPEG-4 AVC Standard, intra luma partition types and prediction modes can all be used for all three color components. Common mode and independent mode are supported. In the common mode, all three components share the exact same information as the luma component, including partition type and prediction modes. In the independent mode, the three color components are coded as separate planes, using the same coding method as the luma plane.

Intra Partitions in Extensions of the MPEG-4 AVC Standard

In a first known approach, the prediction block unit is extended for intra coding by increasing the number of intra direction modes to more than 9. The chroma case is not contemplated or considered. Furthermore, in a second prior art approach, the chroma partition type is fixed to be Chroma_8×8, the same as in the MPEG-4 AVC Standard. Moreover, in the second prior art approach, intra prediction modes and transforms are kept the same as luma intra_16× 16, intra_8×8, and intra_4×4 in the MPEG-4 AVC Standard, i.e., using 4 chroma prediction modes and a cascaded 4×4 transform. For intra_32×32, chroma uses 4 chroma prediction modes and a cascaded 8×8 transform. A very simple low pass filter is applied to the neighboring pixels used for prediction prior to the prediction being generated there from.

Thus, the current filtering of chroma components in accordance with the prior art is at least deficient in that it uses the same filtering for both luma and chroma which can detrimentally affect the subjective quality of the resultant video. Moreover, the filtering for the chroma is fixed, thus not being adaptable to the video content.

SUMMARY

These and other drawbacks and disadvantages of the prior art are addressed by the present principles, which are directed to methods and apparatus for adaptive filtering of prediction pixels for chroma components in video encoding and decoding.

According to an aspect of the present principles, an apparatus is provided. The apparatus includes a video encoder for encoding picture data for at least a portion of a picture. The video encoder includes an adaptive filter for performing filtering of prediction data used to generate an intra prediction for a chroma component of the portion of the picture. The filtering is adaptive with respect to at least one of filter parameters for the filtering and whether the filtering is used or bypassed.

According to another aspect of the present principles, there is provided a method in a video encoder. The method includes encoding picture data for at least a portion of a picture. The encoding step includes performing filtering of prediction data used to generate an intra prediction for a chroma component of the portion of the picture. The filtering is adaptive with respect to at least one of filter parameters for the filtering and whether the filtering is used or bypassed.

According to yet another aspect of the present principles, there is provided an apparatus. The apparatus includes a video decoder for decoding picture data for at least a portion of a picture. The decoding step includes performing filtering of prediction data used to generate an intra prediction for a chroma component of the portion of the picture. The filtering is adaptive with respect to at least one of filter parameters for the filtering and whether the filtering is used or bypassed.

According to still another aspect of the present principles, there is provided a method in a video decoder. The method includes decoding picture data for at least a portion of a picture. The video decoder includes an adaptive filter for performing filtering of prediction data used to generate an intra prediction for a chroma component of the portion of the picture. The filtering is adaptive with respect to at least one of filter parameters for the filtering and whether the filtering is used or, bypassed.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
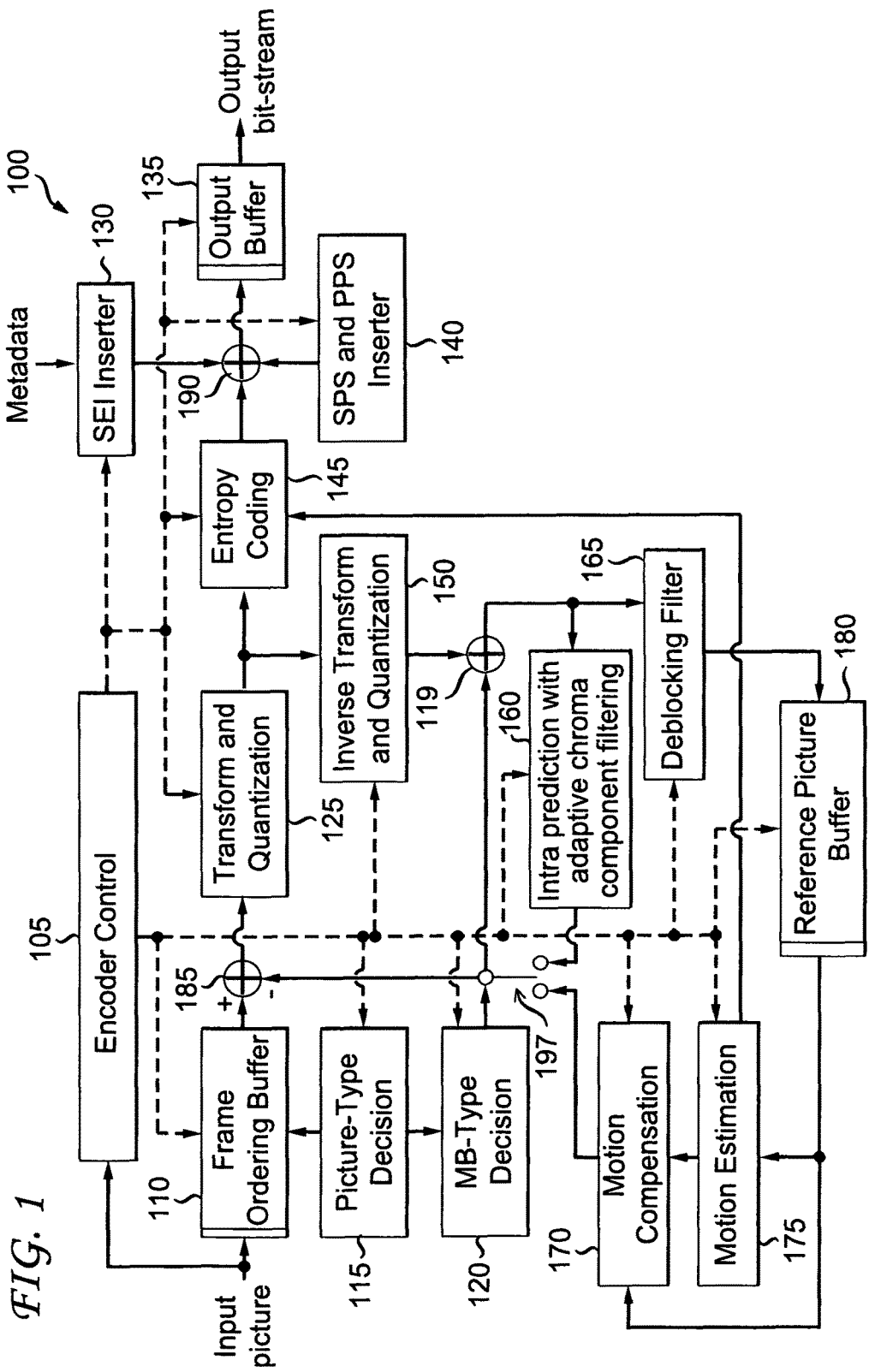
FIG. 1 is a block diagram showing an exemplary video encoder to which the present principles may be applied, in accordance with an embodiment of the present principles.

The present principles are directed to methods and apparatus for adaptive filtering of prediction pixels for chroma components in video encoding and decoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, as used herein, the words "picture" and "image" are used interchangeably and refer to a still image or a picture from a video sequence. As is known, a picture may be a frame or a field.

Further, as used herein, the word "bypass" when used in reference to adaptive filtering in accordance with the present principles, means that either the adaptive filtering is not performed at all (e.g., based on some criteria) or that a result of the adaptive filtering, although obtained, is nonetheless not used in preference of using other data such as, for example, non-filtered data. Thus, we use the term "adaptive filtering" to refer to whether the filtering is applied or bypassed. That is, the filtering is adaptive since it is selectively applied or not (the latter corresponding to the bypass situation), and hence the term "adaptive filtering" is used to describe such filtering in accordance with the present principles. Additionally, in one or more embodiments, we use the term "adaptive filtering" to refer to adapting the filter parameters to, for example, the local video content being encoded or decoded. Thus, for example, a filter length, a filter strength, and/or so forth can be adapted based on the local video content being encoded or decoded.

Also, as used herein, "picture data" refers to data representative of an original or input picture or portion thereof. Thus, such data may refer to, for example, the difference between an original block in a picture and a reference block, where such difference, also known as a "residue", is then transformed, quantized, and entropy coded for output in, for example, a bitstream. Of course, picture data may also include other supportive data such as one or more syntax elements representative of coding modes, and so forth involved in encoding/decoding a current block.

Additionally, as used herein, "prediction data" refers to a co-located (i.e., same location but in a different picture) block and/or one or more neighboring blocks (in the same picture), or a portion of these blocks. Further, as used herein, "prediction value of the prediction data" refers to the actual value that ultimately is used for the prediction data from among two or more candidate values. For example, while the prediction data may be selected from among several candidate sets of data such as filtered prediction data and non-filtered prediction data, the prediction value of the prediction data represents the actual data that is selected and ultimately used from among the candidate values.

Moreover, as used herein, "reconstructed data" refers to the residue data that has been transformed and quantized and then inverse quantized and inverse transformed. Since intra prediction employs neighboring pixels of the block to be predicted to perform the spatial prediction, the neighboring pixels come from the reconstructed data in order for the encoder and decoder to use the same data to derive the prediction. Hence, in some cases as are evident to one of ordinary skill in this and related arts, the phrases "prediction data" and "reconstructed data" are equivalent and, thus, used interchangeably herein.

Also, as used herein, "neighborhood" refers to the pixel above and below when processing a column of data, and the pixel on the left and on the right when processing a row of data. In one or more embodiments herein, we are processing in one dimension and, hence, the preceding definition of neighborhood applies. However, it is to be appreciated that "neighborhood" also more generally refers to a set of pixels surrounding the current pixel.

As noted above, we disclose methods and apparatus for efficient intra chroma coding. For purposes of illustration and description, examples are described herein in the context of improvements over the MPEG-4 AVC Standard, using the MPEG-4 AVC Standard as the baseline for our description and explaining the improvements and extensions beyond the MPEG-4 AVC Standard. However, it is to be appreciated that the present principles are not limited solely to the MPEG-4 AVC Standard and/or extensions thereof. Given the teachings of the present principles provided herein, one of ordinary skill in this and related arts would readily understand that the present principles are equally applicable and would provide at least similar benefits when applied to extensions of other standards, or when applied and/or incorporated within standards not yet developed. It is to be further appreciated that the present principles also apply to video encoders and video decoders that do not conform to standards, but rather confirm to proprietary definitions. Furthermore, for the sake of simplicity, the present principles are described using a 4:2:0 format. However, one of ordinary skill in this and related arts would readily understand that the present principles can be readily applied to other formats (e.g., the 4:2:2 format, the 4:4:4 format, and so forth).

Turning to FIG. 1, an exemplary video encoder to which the present principles may be applied is indicated generally by the reference numeral 100. The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, a first input of a macroblock-type (MB-type) decision module 120, a second input of an intra prediction module with adaptive chroma component filtering 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

An output of the SEI inserter 130 is connected in signal communication with a second non-inverting input of the combiner 190.

A first output of the picture-type decision module 115 is connected in signal communication with a third input of the frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module with adaptive chroma component filtering 160 and a first input of the deblocking filter 165. An output of the deblocking filter 165 is connected in signal communication with a first input of a reference picture buffer 180. An output of the reference picture buffer 180 is connected in signal communication with a second input of the motion estimator 175 and a third input of the motion compensator 170. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module with adaptive chroma component filtering 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module with adaptive chroma component filtering 160. The output of the switch 197 is connected in signal communication with a second non-inverting input of the combiner 119 and an inverting input of the combiner 185.

A first input of the frame ordering buffer 110 and an input of the encoder controller 105 are available as inputs of the encoder 100, for receiving an input picture. Moreover, a second input of the Supplemental Enhancement Information (SEI) inserter 130 is available as an input of the encoder 100, for receiving metadata. An output of the output buffer 135 is available as an output of the encoder 100, for outputting a bitstream.

Figure 2:
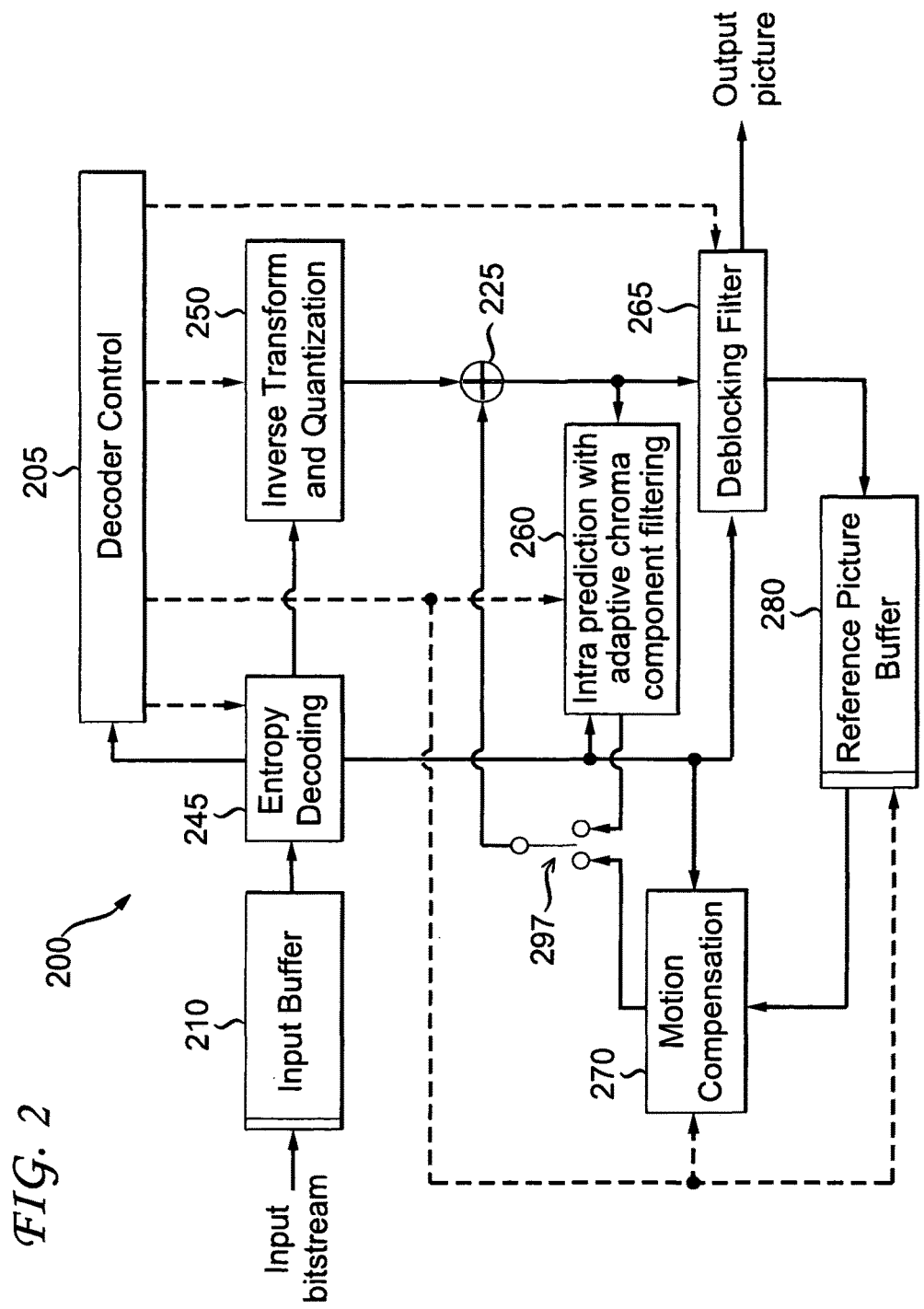
FIG. 2 is a block diagram showing an exemplary video decoder to which the present principles may be applied, in accordance with an embodiment of the present principles.

Turning to FIG. 2, an exemplary video decoder to which the present principles may be applied is indicated generally by the reference numeral 200. The video decoder 200 includes an input buffer 210 having an output connected in signal communication with a first input of an entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module with adaptive chroma component filtering 260. A second output of the deblocking filter 265 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270, a first input of the deblocking filter 265, and a third input of the intra predictor with adaptive chroma component filtering 260. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module with adaptive chroma component filtering 260, a first input of the motion compensator 270, and a second input of the reference picture buffer 280.

An output of the motion compensator 270 is connected in signal communication with a first input of a switch 297. An output of the intra prediction module with adaptive chroma component filtering 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the deblocking filter 265 is available as an output of the decoder 200, for outputting an output picture.

Regarding FIGS. 1 and 2, intra prediction module 160 of FIG. 1 and intra prediction module 260 of FIG. 2 each include one or more filters for performing adaptive filtering of chroma components in accordance with the present principles.

As noted above, the present principles are directed to methods and apparatus for adaptive filtering of prediction pixels for chroma components in video encoding and decoding. In particular, we disclose methods and apparatus that provide an improved chroma intra prediction by filtering the chroma samples with an adaptive filtering process.

In general, intra prediction employs neighboring pixels of the block to be predicted to perform the spatial prediction. These pixels come from the reconstructed data, so the encoder and decoder use the same data to derive the prediction.

Specifically regarding the above described prior art, the data employed for the intra prediction of large blocks (e.g., blocks having a block size of at least 8×8 or greater) is subjected to a non-adaptive filtering process in order to smooth the signal, thus avoiding large values that may damage the prediction while eliminating part of the noise.

The prior art filter that has been used thus far is simply a low-pass filter of 3 taps: [1 2 1]/4.

We have observed that this prior art filter does not provide PSNR gains for the chroma component. In addition, the subjective quality seems to be worse, that is, the filter introduces chroma artifacts. The reason that such prior art filtering is unproductive is that the chroma component is very smooth in most regions, but also includes some edges. The filter blurs the edges, so the colors of one region at least partially migrate and/or otherwise go into adjacent regions. This creates annoying and unnatural artifacts noticeable to the viewer. We propose the use of an adaptive filter for the chroma component that is able to tackle the smooth regions as well as the edges therein. It is to be appreciated that one or more filters may be used to filter a particular chroma block in accordance with the present principles.

In one embodiment, we propose to use an edge detector to determine whether or not to adaptively filter the neighboring (i.e., prediction) data. When no edge is detected in a particular chroma block or region currently being processed (e.g., encoded or decoded), the neighboring data is filtered with a low-pass filter. If an edge is detected, then the neighboring data is not filtered (i.e., no filter is applied).

In another embodiment, we use an edge detector to determine the particular filter to use. In an embodiment, depending on the strength and distance of the edge, the filter length and the filter strength are varied in order to adapt to the edge. As used herein, "strength of the edge" refers to how large the edge is, which can be determined, for example, by checking the absolute value of the difference between two pixels at both sides of the edge. The closer the edge, the shorter/weaker the filter is. When the edge is not close and it is not very strong, then a stronger and longer low-pass filter is applied to the region. Note that in this embodiment, the filter adapts and varies on a pixel-wise basis, while in the previous embodiment the filter adapts and varies on a block-wise basis.

In another embodiment, first a linear low-pass filter is applied to the neighboring reconstructed pixels. Then, for each pixel, the absolute value of the difference between the filtered value and the non-filtered value is computed. If the absolute value of the difference is below a threshold, then the filtered value is kept (i.e., the filtered value is used for the prediction). Otherwise, the non-filtered value is kept (i.e., the non-filtered value is used for the prediction). In this way, the smooth regions are filtered and the regions with edges or with a lot of texture are mainly non-filtered, since in this embodiment the difference between filtered and non-filtered values is higher. In an embodiment, the threshold may depend on the quantization step size.

Similarly, in another embodiment, a linear low-pass filter is applied to the neighboring reconstructed pixels. Then, for each pixel, the absolute value of the difference between the filtered value and the non-filtered value is computed. If the absolute value of the difference is below a threshold, then the filtered value is kept (i.e., the filtered value is used for the prediction). Otherwise, the final value is the non-filtered value plus an amount depending on the threshold and the filtered value. For example, the final value can be the non-filtered value plus the threshold, that is, the filtering process is saturated at the values marked by the threshold. Also, the final value can be the non-filtered value plus the threshold and half the difference between the non-filtered value plus threshold and the filtered value.

Figure 3:
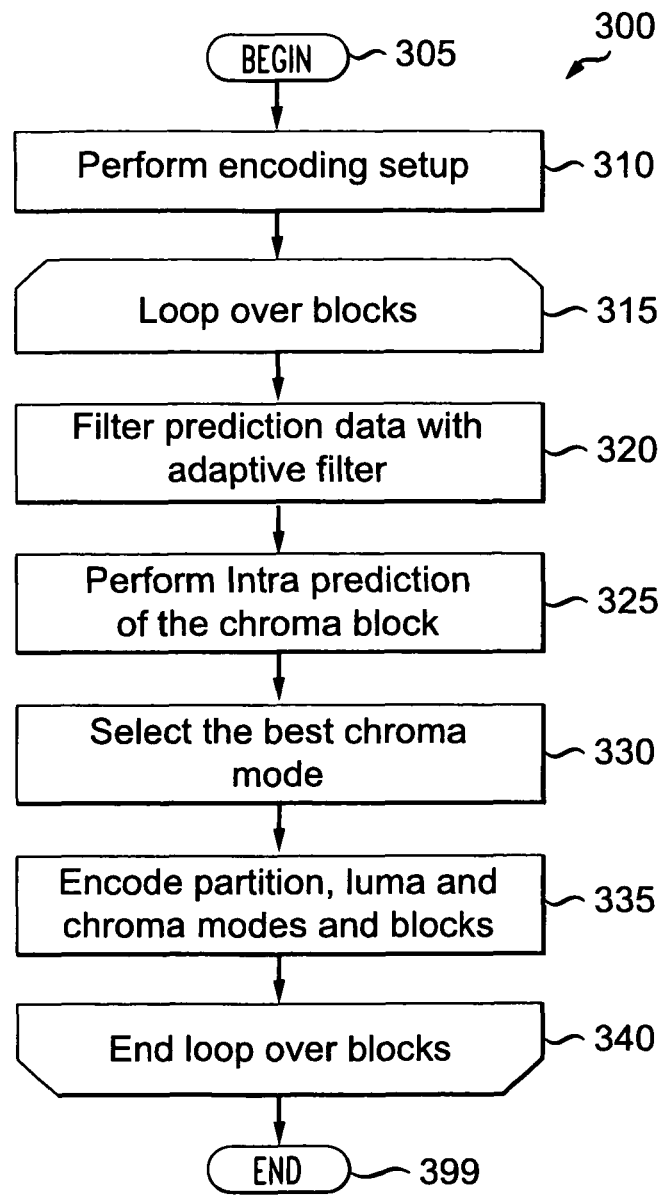
FIG. 3 is a flow diagram showing an exemplary method for performing chroma intra prediction in a video encoder, in accordance with an embodiment of the present principles.

Turning to FIG. 3, an exemplary method for performing chroma intra prediction in a video encoder is indicated generally by the reference numeral 300. The method 300 includes a start block 305 that passes control to a function block 310. The function block 310 performs an encoding setup, and passes control to a loop limit block 315. The loop limit block 315 begins a loop over the blocks (e.g., chroma blocks and luma blocks) in a current picture to be processed, and passes control to a function block 320. The function block 320 filters prediction data for a current chroma block with an adaptive filter, and passes control to a function 325. The function block 325 performs intra prediction of the current chroma block, and passes control to a function block 330. The function block 330 selects the best chroma intra prediction mode, and passes control to a function block 335. The function block 335 encodes the partition, luma and chroma modes and blocks for the current picture, and passes control to a loop limit block 340. The loop limit block 340 ends the loop over the blocks, and passes control to an end block 399.

Figure 4:
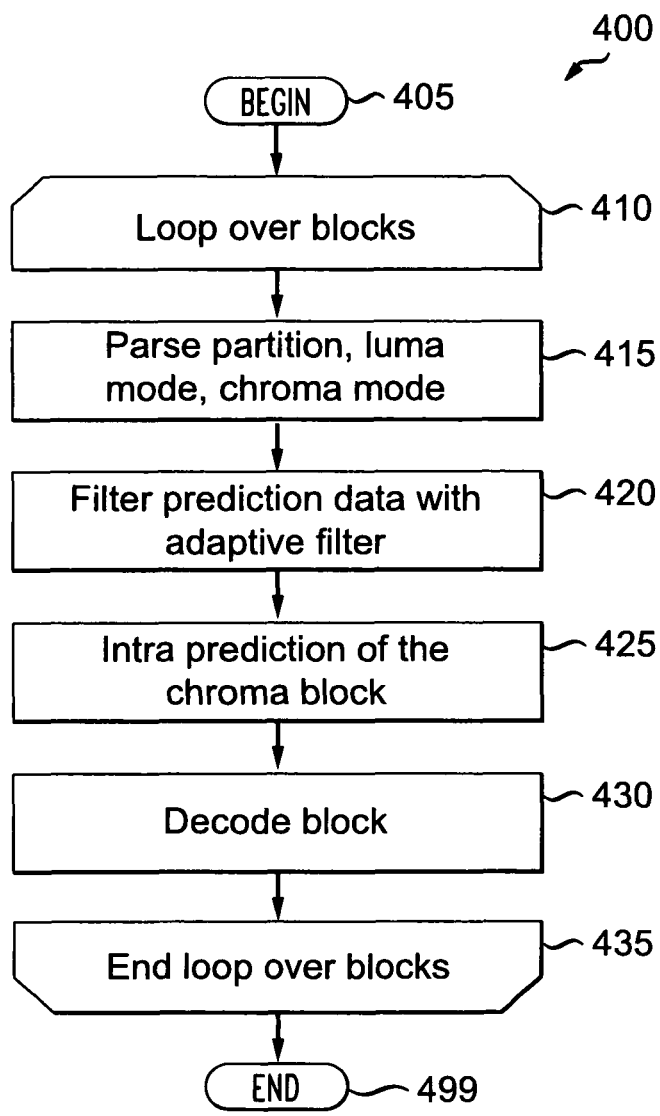
FIG. 4 is a flow diagram showing an exemplary method for performing chroma intra prediction in a video decoder, in accordance with an embodiment of the present principles.

Turning to FIG. 4, an exemplary method for performing intra chroma prediction in a video decoder is indicated generally by the reference numeral 400. The method 400 includes a start block 405 that passes control to a loop limit block 410. The loop limit block 410 begins a loop over the blocks in a current picture to be processed, and passes control to a function block 415. The function block 415 parses the partition, luma mode, and chroma mode, and passes control to a function block 420. The function block 420 filters prediction data for a current chroma block with an adaptive filter, and passes control to a function block 425. The function block 425 performs intra prediction of the current chroma block, and passes control to a function block 430. The function block 430 decodes the current chroma block, and passes control to a loop limit block 435. The loop limit block 435 ends the loop over the blocks, and passes control to an end block 499.

Figure 5:
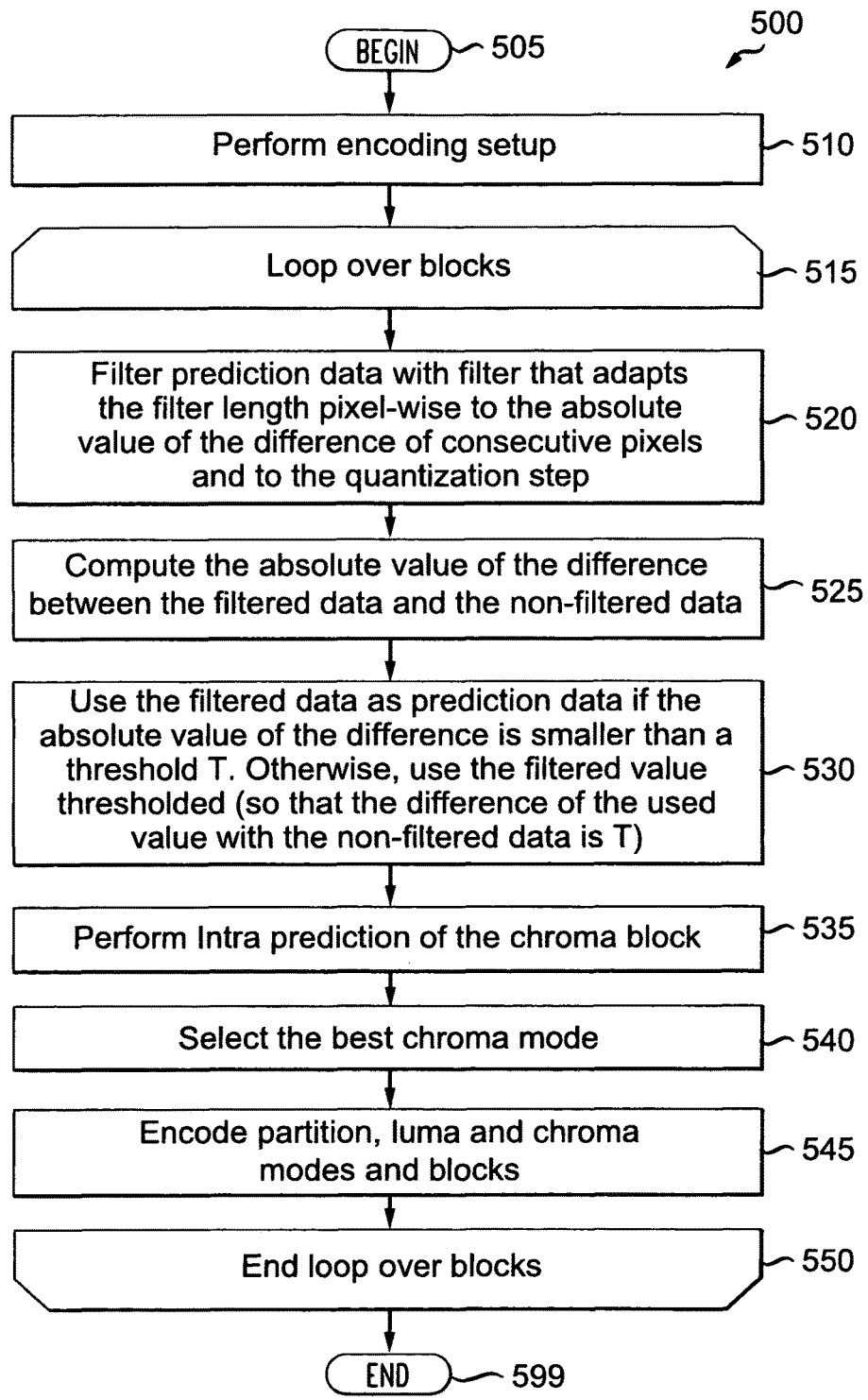
FIG. 5 is a flow diagram showing another exemplary method for performing chroma intra prediction in a video encoder, in accordance with an embodiment of the present principles.

Turning to FIG. 5, another exemplary method for performing chroma intra prediction in a video encoder is indicated generally by the reference numeral 500. The method 500 includes a start block 505 that passes control to a function block 510. The function block 510 performs an encoding setup, and passes control to a loop limit block 515. The loop limit block 515 begins a loop over the blocks in a current picture, and passes control to a function block 520. The function block 520 filters prediction data with a filter that adapts the filter length pixel-wise to the absolute value of the difference of consecutive pixels and to the quantization step, and passes control to a function block 525. The function block 525 computes the absolute value of the difference between the filtered data and the non-filtered data, and passes control to a function block 530. The function block 530 uses the filtered data as prediction data if the absolute value of the difference (as computed by function block 525) is smaller than a threshold T, otherwise uses the filtered value thresholded (so that the difference of the used value with the non-filtered data is T), and passes control to a function block 535. The function block 535 performs intra prediction of the chroma block, and passes control to a function block 540. The function block 540 selects the best chroma mode, and passes control to a function block 545. The function block 545 encodes partition, luma and chroma modes, and blocks, and passes control to a loop limit block 550. The loop limit block 550 ends the loop over the blocks, and passes control to an end block 599.

Figure 6:
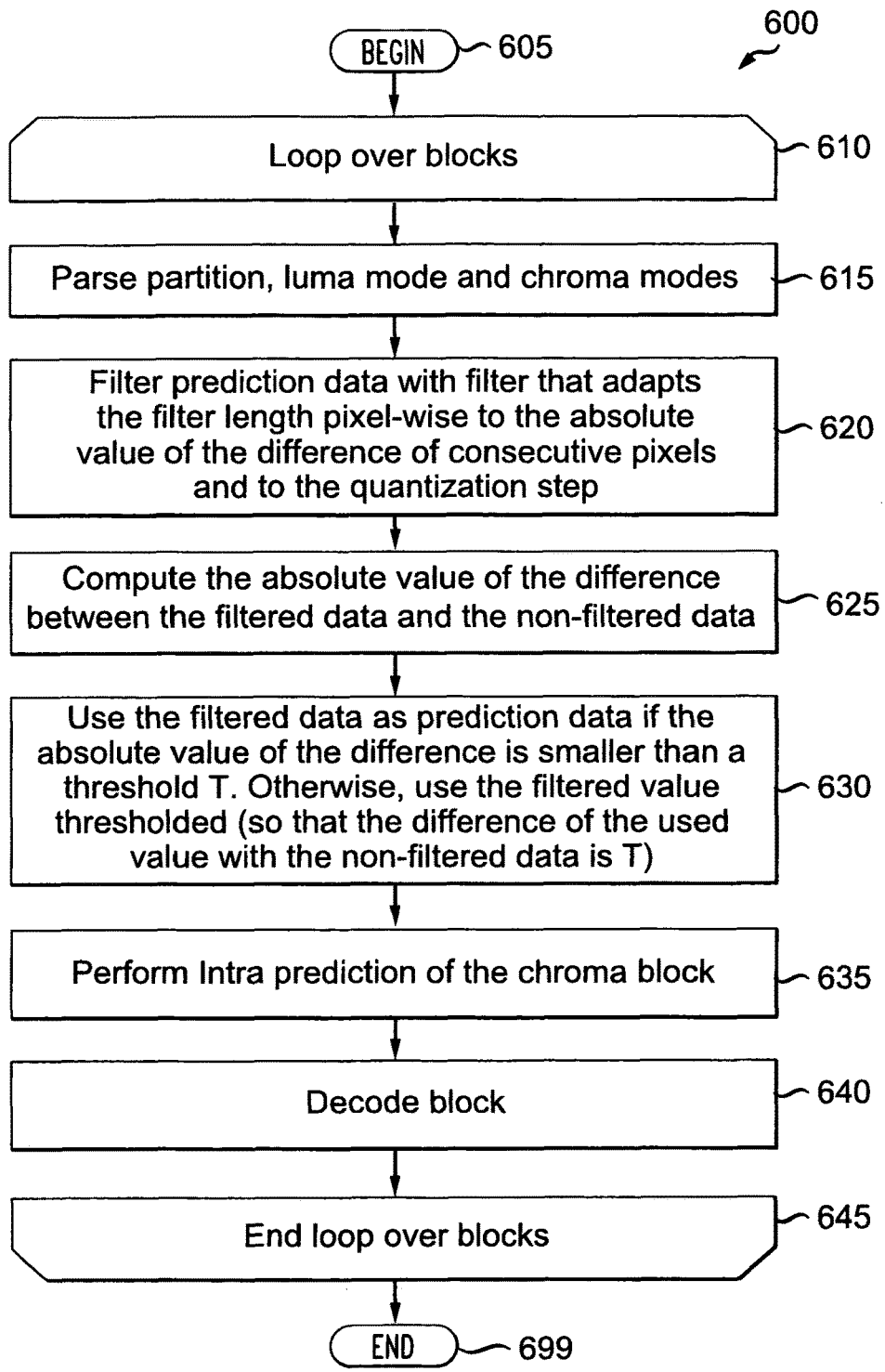
FIG. 6 is a flow diagram showing another exemplary method for performing chroma intra prediction in a video decoder, in accordance with an embodiment of the present principles.

Turning to FIG. 6, an exemplary method for performing intra chroma prediction in a video decoder is indicated generally by the reference numeral 600. The method 600 includes a start block 605 that passes control to a loop limit block 610. The loop limit block 610 begins a loop over the blocks in a current picture, and passes control to a function block 615. The function block 615 parses partition, luma and chroma modes, and passes control to a function block 620. The function block 620 filters prediction data with a filter that adapts the filter length pixel-wise to the absolute value of the difference of consecutive pixels and to the quantization step, and passes control to a function block 625. The function block 625 computes the absolute value of the difference between the filtered data and the non-filtered data, and passes control to a function block 630. The function block 630 uses the filtered data as prediction data if the absolute value of the difference (as computed by function block 625) is smaller than a threshold T, therwise uses the filtered value thresholded (so that the difference of the used value with the non-filtered data is T), and passes control to a function block 635. The function block 635 performs intra prediction of the chroma block, and passes control to a function block 640. The function block 640 decodes the block, and passes control to a loop limit block 645. The loop limit block 645 ends the loop over the blocks, and passes control to an end block 699.

A description will now be given of some of the many attendant advantages/features of the present invention, some of which have been mentioned above. For example, one advantage/feature is an apparatus having a video encoder for encoding picture data for at least a portion of a picture. The video encoder includes an adaptive filter for performing filtering of prediction data used to generate an intra prediction for a chroma component of the portion of the picture. The filtering is adaptive with respect to at least one of filter parameters for the filtering and whether the filtering is used or bypassed.

Another advantage/feature is the apparatus having the video encoder as described above, wherein an adaptation process is used to determine at least one of a filter length and a filter strength applied to each pixel of the chroma component.

Yet another advantage/feature is the apparatus having the video encoder as described above, wherein an adaptation process is used to determine whether the adaptive filtering is used or bypassed to generate the intra prediction for the chroma component of the portion of the picture, a result of the adaptation process depending on the prediction data.

Still another advantage/feature is the apparatus having the video encoder wherein an adaptation process is used to determine whether the adaptive filtering is used or bypassed to generate the intra prediction for the chroma component of the portion of the picture, a result of the adaptation process depending on the prediction data as described above, wherein local statistics of the prediction data are used to determine at least one of a filter type, a filter length, and a filter strength applied to each pixel of the chroma component.

Moreover, another advantage/feature is the apparatus having the video encoder wherein local statistics of the prediction data are used to determine at least one of a filter type, a filter length, and a filter strength applied to each pixel of the chroma component as described above, wherein the local statistics comprise at least one of a variance, a mean, and parameters of one or more edges in the portion of the picture.

Further, another advantage/feature is the apparatus having the video encoder wherein local statistics of the prediction data are used to determine at least one of a filter type, a filter length, and a filter strength applied to each pixel of the chroma component as described above, wherein the adaptation process bypasses the filtering for a current pixel when an absolute value of a difference between the current pixel and at least one neighboring pixel is greater than or equal to a threshold.

Also, another advantage/feature is the apparatus having the video encoder as described above, wherein an adaptation process is used to determine whether the filtering is used or bypassed to generate the intra prediction for the chroma component of the portion of the picture, a result of the adaptation process depending on a quantization step size applied to pixels of the prediction data.

Additionally, another advantage/feature is the apparatus having the video encoder as described above, wherein the prediction data is filtered to obtain filtered prediction data, and a prediction value of the prediction data used to generate the intra prediction for the chroma component of the portion of the picture is a function of the prediction data and the filtered prediction data.

Moreover, another advantage/feature is the apparatus having the video encoder, wherein the prediction data is filtered to obtain filtered prediction data, and a prediction value of the prediction data used to generate the intra prediction for the chroma component of the portion of the picture is a function of the prediction data and the filtered prediction data as described above, wherein the function selects between one of the prediction data or the filtered prediction data as the prediction value.

Further, another advantage/feature is the apparatus having the video encoder, wherein the prediction data is filtered to obtain filtered prediction data, and a prediction value of the prediction data used to generate the intra prediction for the chroma component of the portion of the picture is a function of the prediction data and the filtered prediction data as described above, wherein an absolute value of a difference between the prediction data and the filtered prediction data determines the prediction value.

Also, another advantage/feature is the apparatus having the video encoder, wherein the prediction data is filtered to obtain filtered prediction data, and a prediction value of the prediction data used to generate the intra prediction for the chroma component of the portion of the picture is a function of the prediction data and the filtered prediction data as described above, wherein the function is dependent on a quantization step applied to pixels of the prediction data.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a processor, configured to:
encode picture data for at least a portion of a picture, wherein the processor is further configured to:
adaptively filter prediction data used to generate an intra prediction for said encoding of a chroma component of at least a portion of a picture,
wherein the filtering is adaptive with respect to at least one of filter parameters for the filtering,
wherein the prediction data is filtered to obtain filtered prediction data, and a prediction value of the prediction data used to generate the intra prediction for the chroma component of the portion of the picture is a function of the prediction data and the filtered prediction data, and
wherein a difference between filtered and unfiltered predictions is used to determine whether to use said filtered or unfiltered prediction for said encoding, and
wherein an edge detection is used to determine whether the adaptive filtering is used or by-passed and the edge detection is used to determine strength and distance of an edge to vary at least one of a filter length and a filter strength applied to each pixel of the chroma component, wherein said edge detection detects an edge that is determined depending on a difference between two adjacent chroma pixels of the prediction data.

2. The apparatus of claim 1, wherein an adaptation process is used to determine whether the filtering is used or bypassed to generate the intra prediction for the chroma component of the portion of the picture, a result of the adaptation process depending on the prediction data.

3. The apparatus of claim 1, wherein an adaptation process is used to determine whether the filtering is used or bypassed to generate the intra prediction for the chroma component of the portion of the picture, a result of the adaptation process depending on a quantization step size applied to pixels of the prediction data.

4. The apparatus of claim 1, wherein the function selects between one of the prediction data or the filtered prediction data as the prediction value.

5. The apparatus of claim 1, wherein an absolute value of a difference between the prediction data and the filtered prediction data determines the prediction value.

6. The apparatus of claim 1, wherein the function is dependent on a quantization step size applied to pixels of the prediction data.

7. A method, comprising:
encoding picture data for at least a portion of a picture, wherein said encoding step includes:
performing filtering of prediction data used to generate an intra prediction for a chroma component of at least a portion of a picture,
wherein the filtering is adaptive with respect to at least one of filter parameters for the filtering,
wherein the prediction data is filtered to obtain filtered prediction data, and a prediction value of the prediction data used to generate the intra prediction for the chroma component of the portion of the picture is a function of the prediction data and the filtered prediction data,
wherein a difference between filtered and unfiltered predictions is used to determine whether to use said filtered or unfiltered prediction for said encoding,
wherein an edge detection is used to determine whether the adaptive filtering is used or by-passed and the edge detection is used to determine strength and distance of an edge to vary at least one of a filter length and a filter strength applied to each pixel of the chroma component, and
wherein said edge detection detects an edge that is determined depending on a difference between two adjacent chroma pixels of the prediction data.

8. The method of claim 7, wherein an adaptation process is used to determine whether the filtering is used or bypassed to generate the intra prediction for the chroma component of the portion of the picture, a result of the adaptation process depending on the prediction data.

9. The method of claim 7, wherein an adaptation process is used to determine whether the filtering is used or bypassed to generate the intra prediction for the chroma component of the portion of the picture, a result of the adaptation process depending on a quantization step size applied to pixels of the prediction data.

10. The method of claim 7, wherein the function selects between one of the prediction data or the filtered prediction data as the prediction value.

11. The method of claim 7, wherein an absolute value of a difference between the prediction data and the filtered prediction data determines the prediction value.

12. The method of claim 7, wherein the function is dependent on a quantization step size applied to pixels of the prediction data.

13. An apparatus, comprising:
a processor, configured to:
decode picture data for at least a portion of a picture, wherein the processor is further configured to:
adaptively filter prediction data used to generate an intra prediction for said decoding of a chroma component of at least a portion of the picture,
wherein the filtering is adaptive with respect to at least one of filter parameters,
wherein the prediction data is filtered to obtain filtered prediction data, and a prediction value of the prediction data used to generate the intra prediction for the chroma component of the portion of the picture is a function of the prediction data and the filtered prediction data,
wherein a difference between filtered and unfiltered predictions is used to determine whether to use said filtered or unfiltered prediction for said decoding, wherein an edge detection is used to determine whether the adaptive filtering is used or by-passed and the edge detection is used to determine strength and distance of an edge to vary at least one of a filter length and a filter strength applied to each pixel of the chroma component, and wherein said edge detection detects an edge that is determined depending on a difference between two adjacent chroma pixels of the prediction data.

14. The apparatus of claim 13, wherein an adaptation process is used to determine whether the filtering is used or bypassed to generate the intra prediction for the chroma component of the portion of the picture, a result of the adaptation process depending on the prediction data.

15. The apparatus of claim 13, wherein an adaptation process is used to determine whether the filtering is used or bypassed to generate the intra prediction for the chroma component of the portion of the picture, a result of the adaptation process depending on a quantization step size applied to pixels of the prediction data.

16. The apparatus of claim 13, wherein the function selects between one of the prediction data or the filtered prediction data as the prediction value.

17. The apparatus of claim 13, wherein an absolute value of a difference between the prediction data and the filtered prediction data determines the prediction value.

18. The apparatus of claim 13, wherein the function is dependent on a quantization step size applied to pixels of the prediction data.

19. A method, comprising:
    decoding picture data for at least a portion of a picture, wherein said decoding step includes:
        performing filtering of prediction data to generate an intra prediction for a chroma component of at least a portion of the picture,
        wherein the filtering is adaptive with respect to at least one of filter parameters,
        wherein the prediction data is filtered to obtain filtered prediction data, and a prediction value of the prediction data used to generate the intra prediction for the chroma component of the portion of the picture is a function of the prediction data and the filtered prediction data,
        wherein a difference between filtered and unfiltered predictions is used to determine whether to use said filtered or unfiltered prediction for said decoding,
        wherein an edge detection is used to determine whether the adaptive filtering is used or by-passed and the edge detection is used to determine strength and distance of an edge to vary at least one of a filter length and a filter strength applied to each pixel of the chroma component, and
        wherein said edge detection detects an edge that is determined depending on a difference between two adjacent pixels of the prediction data.

20. The method of claim 19, wherein an adaptation process is used to determine whether the filtering is used or bypassed to generate the intra prediction for the chroma component of the portion of the picture, a result of the adaptation process depending on the prediction data.

21. The method of claim 19, wherein an adaptation process is used to determine whether the filtering is used or bypassed to generate the intra prediction for the chroma component of the portion of the picture, a result of the adaptation process depending on a quantization step size applied to pixels of the prediction data.

22. The method of claim 19, wherein the function selects between one of the prediction data or the filtered prediction data as the prediction value.

23. The method of claim 19, wherein an absolute value of a difference between the prediction data and the filtered prediction data determines the prediction value.

24. The method of claim 19, wherein the function is dependent on a quantization step size applied to pixels of the prediction data.

25. A non-transitory computer readable medium containing data content generated according to the method of claim 7, for playback using a processor.

* * * * *